(12) United States Patent
Prater et al.

(10) Patent No.: US 8,978,306 B2
(45) Date of Patent: Mar. 17, 2015

(54) VEHICLE SEAL SYSTEM

(75) Inventors: David Prater, Canton, MI (US); Troy Belliston, Milford, MI (US)

(73) Assignee: Guardian Industries Corp., Auburn Hills, MI (US)

( * ) Notice: Subject to any disclaimer, the term of this patent is extended or adjusted under 35 U.S.C. 154(b) by 11 days.

(21) Appl. No.: 12/926,628

(22) Filed: Nov. 30, 2010

(65) Prior Publication Data

US 2011/0126473 A1    Jun. 2, 2011

Related U.S. Application Data

(60) Provisional application No. 61/272,998, filed on Dec. 1, 2009.

(51) Int. Cl.
  *E06B 7/16*    (2006.01)
(52) U.S. Cl.
  USPC ............................ 49/440; 49/495.1; 49/489.1
(58) Field of Classification Search
  USPC ............................ 49/489.1, 440, 495.1, 475.1
  See application file for complete search history.

(56) References Cited

U.S. PATENT DOCUMENTS

| | | | |
|---|---|---|---|
| 4,875,307 A | | 10/1989 | Barbero |
| 5,014,464 A | * | 5/1991 | Dupuy et al. .................... 49/440 |
| 5,317,835 A | * | 6/1994 | Dupuy et al. .................... 49/441 |
| 5,611,550 A | | 3/1997 | Belser |
| 5,702,148 A | * | 12/1997 | Vaughan et al. ........... 296/146.9 |
| 5,743,047 A | * | 4/1998 | Bonne et al. ................. 49/490.1 |
| 5,779,956 A | * | 7/1998 | Hollingshead et al. ....... 264/138 |
| 5,899,022 A | | 5/1999 | Gaw, Jr. et al. |
| 6,668,490 B2 | * | 12/2003 | Hock et al. ...................... 49/502 |
| 6,679,003 B2 | * | 1/2004 | Nozaki et al. ................... 49/441 |
| 6,692,245 B1 | | 2/2004 | Lanoue et al. |
| 6,702,301 B1 | | 3/2004 | Davies et al. |

(Continued)

FOREIGN PATENT DOCUMENTS

| | | |
|---|---|---|
| CA | 2691979 A1 | 1/2009 |
| CA | 2742836 A1 | 4/2010 |

(Continued)

OTHER PUBLICATIONS

Definition—Current The American Heritage® Dictionary of the English Language, Fourth Edition copyright © 2000 by Houghton Mifflin Company. Updated in 2009. Published by Houghton Mifflin Company. All rights reserved.*

(Continued)

*Primary Examiner* — Gregory J Strimbu
(74) *Attorney, Agent, or Firm* — Harness, Dickey & Pierce, PLC

(57) ABSTRACT

A vehicle sealing system includes an outer sash molding component, an inner sash trim component, a first seal, and first, second and third seal members. The outer sash molding component covers a first portion of a door frame member. The inner sash trim component covers a second portion of the door frame member. The first seal is co-extruded with the outer sash molding component. The first seal member is dual shot molded with the inner sash trim component. The second seal member is co-extruded with the outer sash molding component. An end of the outer sash molding component is embedded in the second seal member. The third seal member forms a cushion between the glass and the door frame member. The seal members are spaced apart from each other and coupled to one of the outer sash molding component and the inner sash trim component separately from each other.

13 Claims, 6 Drawing Sheets

(56) References Cited

U.S. PATENT DOCUMENTS

| | | | |
|---|---|---|---|
| 6,729,674 B2 | 5/2004 | Davis et al. | |
| 6,817,651 B2 | 11/2004 | Carvalho et al. | |
| 7,052,021 B2 | 5/2006 | Plottnik | |
| 7,086,201 B2 | 8/2006 | Struyven et al. | |
| 7,763,197 B2 * | 7/2010 | Ellis et al. | 264/173.17 |
| 2001/0015035 A1 * | 8/2001 | Nozaki | 49/440 |
| 2001/0025455 A1 * | 10/2001 | Nozaki et al. | 49/489.1 |
| 2002/0108313 A1 * | 8/2002 | Nozaki et al. | 49/441 |
| 2005/0155293 A1 * | 7/2005 | Dron | 49/490.1 |
| 2007/0000180 A1 * | 1/2007 | Oba et al. | 49/498.1 |
| 2007/0068085 A1 * | 3/2007 | Ninomiya et al. | 49/489.1 |
| 2007/0137112 A1 * | 6/2007 | Furuzawa et al. | 49/489.1 |
| 2007/0251152 A1 * | 11/2007 | Takase et al. | 49/441 |
| 2008/0178531 A1 * | 7/2008 | Takeuchi et al. | 49/475.1 |
| 2009/0241430 A1 * | 10/2009 | Knape | 49/489.1 |

FOREIGN PATENT DOCUMENTS

| | | |
|---|---|---|
| DE | 69000419 T2 | 4/1993 |
| EP | 0384852 A2 | 8/2009 |
| FR | 2913215 A1 | 9/2008 |
| FR | 2913215 A1 | 7/2011 |
| WO | 0006406 A1 | 2/2000 |
| WO | 2007022355 A2 | 2/2007 |
| WO | 2007022355 A2 | 10/2007 |
| WO | 2008132302 A2 | 6/2008 |

OTHER PUBLICATIONS

U.S. Appl. No. 61/272,998 filed Dec. 1, 2009; Prater et al.
Priority application PCT/US2010/003062 International Search Report and Written Opinion dated Mar. 9, 2011.
International Search Report and Written Opinion regarding Application No. PCT/US2010/003062 issued Jun. 5, 2012.

* cited by examiner

VEHICLE SEAL SYSTEM

CROSS REFERENCE TO RELATED APPLICATION

This application claims the benefit of U.S. application Ser. No. 61/272,998, filed on Dec. 1, 2009, the entire contents of which are hereby incorporated herein by reference.

FIELD OF THE INVENTION

Certain example embodiments of this invention relate to improved seal systems that cooperate with daylight openings in vehicles (e.g., cars, trucks, tractors, airplanes, boats, etc.), and/or methods of making the same. More particularly, certain example embodiments of this invention relate to improved seal systems that include flexible seals that are integrally formed (e.g., co-extruded) with other vehicle components, and/or methods of making the same. Certain example embodiments advantageously reduce the need for, and sometimes completely eliminate, current U-shaped and/or other seals.

BACKGROUND AND SUMMARY OF EXAMPLE EMBODIMENTS OF THE INVENTION

Vehicle sealing systems are known. See, for example, U.S. Pat. Nos. 5,611,550; 5,899,022; 6,692,245; 6,702,301; 6,729,674; 6,817,651; 7,052,021; and 7,086,201, each of which is hereby incorporated by reference herein in its entirety.

Door seals, and door interior window seals for attaching to a door window opening in an automotive vehicle for instance, typically perform many functions. Such functions may include, for example, reducing the amount of moisture, dirt, debris, and/or the like that is able to get into the interior of the vehicle. The seal also may prevent noise such as road, engine, and wind noise from entering into the passenger compartment. Additionally, the seal may in part determine the quality of the fit between a vehicle door interior trim panel, inner door panel and side window. As will be appreciated, a good fit may affect window opening and closing characteristics, as well as window rattle and seal appearance, etc.

Some current systems involve flexible seal members that are biased such that they deform when a window or like component is opened or closed. These seal members typically are provided as parts of separate components that are not integrally formed with other components of the vehicle such as, for example, the trim. These separate parts typically require additional assembly and material.

Although these seals are effective, further improvements are still possible. For example, it would be desirable to move the window outboard, e.g., by providing a smaller profile and/or to increase the amount of area visible through a window. This may be advantageous from structural, functional, and/or aesthetic perspectives, e.g., in terms of increased cabin space, increased viewable areas, etc. Reducing the amount of material also could be advantageous in terms of cost reductions, ease of assembly, etc. Unfortunately, it is not always possible to simply make various components smaller or thinner or to simply remove them. Indeed, subtle changes in size, shape, position, etc., often affect structural and/or functional aspects of the seal.

Thus, it will be appreciated that there is a need in the art for improved seal systems that cooperate with daylight openings in vehicles (e.g., cars, trucks, tractors, airplanes, boats, etc.), and/or methods of making the same.

In certain example embodiments of this invention, improved seal systems that include flexible seals that are integrally formed (e.g., co-extruded) with other vehicle components, and/or methods of making the same, are provided.

One aspect of certain example embodiments of this invention relates to integrating some or all sealing system components into trim and/or other components of the vehicle such as, for example, more structural elements of the vehicle that generally are required to be present.

Another aspect of certain example embodiments relates to the partial or complete elimination of the current U-shaped seal that typically is used to receive the glass of a window.

Still another aspect of certain example embodiments relates to forming seal members together with trim components, e.g., as a part of the roll form and/or extruding processes.

Certain example embodiments provide first, second, and/or third seals. These seals may be provided in any suitable combination or sub-combination.

Furthermore, certain example embodiments provide first, second, third, and/or fourth seal members in or on a U-shaped cavity of a door construct. These seal members also may be provided in any suitable combination or sub-combination.

In certain example embodiments, a vehicle sealing system is provided. A door construct includes a generally U-shaped cavity formed therein for receiving glass from a window. An outer sash molding component is provided at an outer edge of the vehicle sealing system. An inner sash trim component is provided at an interior of the vehicle sealing system. A first seal is located proximate to an exterior of the vehicle sealing system, with the first seal including a flexible seal member co-extruded with the outer sash molding component. A second seal is located proximate to an interior of the vehicle sealing system, with the second seal including a lip or trim fastener. First, second, and third seal members are provided in or on the generally U-shaped cavity formed in the door construct. The first seal member is dual shot molded together with the inner sash trim component. The second seal member is co-extruded with the outer sash molding component, with the first and second seal members being inwardly rotatable upon receiving a biasing force from upward movement of the glass. The third seal member is provided on a base of the generally U-shaped cavity so as to form a cushion between the glass and the door construct.

In certain example embodiments, a vehicle door comprising a sealing system may be provided. A door construct includes a generally U-shaped cavity formed therein for receiving glass from a window, with the door construct comprising a roll-formed outer structure and a stamped inner structure. A roll-formed outer sash molding component is provided at an outer edge of the vehicle sealing system. An inner sash trim component is provided at an interior of the vehicle sealing system. First, second, and third seal members are provided in or on the generally U-shaped cavity formed in the door construct. The first seal member is dual shot molded together with the inner sash trim component. The second seal member is co-extruded with the outer sash molding component, with the first and second seal members being inwardly rotatable upon receiving a biasing force from upward movement of the glass. The third seal member is provided on a base of the generally U-shaped cavity so as to form a cushion between the glass and the door construct.

Optionally, a fourth seal member may be located on an inner leg of the generally U-shaped cavity, with the fourth seal member forming a cushion between the first seal member and the inner leg of the cavity.

Vehicle sealing systems, vehicle doors, and/or vehicles incorporating the same may be provided in different embodiments of this invention.

Similarly, methods of making the same also may be provided in certain example embodiments of this invention.

The features, aspects, advantages, and example embodiments described herein may be combined in any suitable combination or sub-combination to realize yet further embodiments of this invention.

DETAILED DESCRIPTION OF EXAMPLE EMBODIMENTS OF THE INVENTION

Figure 1:
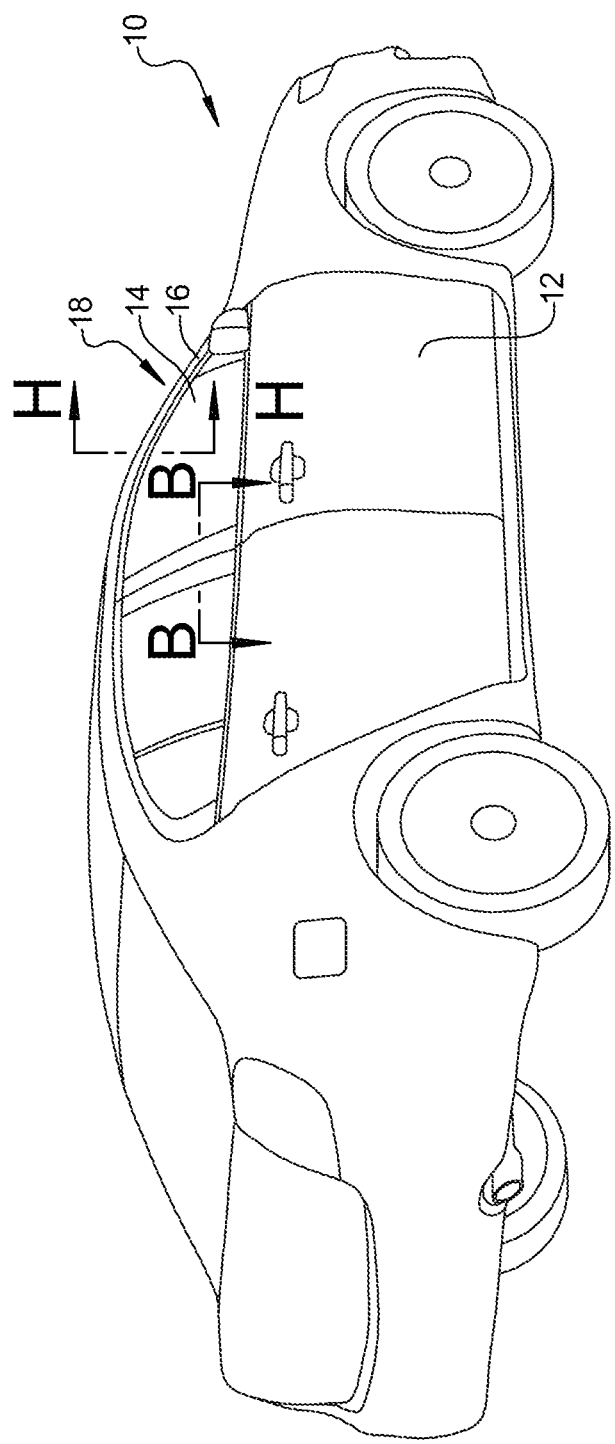
FIG. 1 is an example vehicle.

Referring now more particularly to the accompanying drawings in which like reference numerals indicate like parts throughout the several views.

In certain example embodiments of this invention, improved seal systems that include flexible seals that are integrally formed (e.g., co-extruded) with other vehicle components, and/or methods of making the same, are provided. In certain example embodiments, some or all sealing system components may be integrated into trim and/or other components of the vehicle such as, for example, more structural elements of the vehicle that generally are required to be present. For instance, in certain example embodiments, the current U-shaped seal that typically is used to receive the glass of a window may be replaced with seal members attached to elements of the overall vehicle construct. Certain example embodiments accomplish this integration, for example, by forming seal members together with the trim components, e.g., as a part of the roll form and/or extruding processes.

FIG. 1 is an example vehicle 10. The vehicle 10 in FIG. 1 includes a door 12, which has a daylight opening 14 (in this illustrative case, a vehicle side window) disposed therein. The window 14 moves substantially vertically in the door 12. As the window opens and closes, it becomes more or less recessed in the body of the door 12. In a completely closed position, the window 14 extends into the frame 16 of the door 12. It is sealed therein using a seal system 18 provided in the frame 16 of the door 12.

Figure 2:
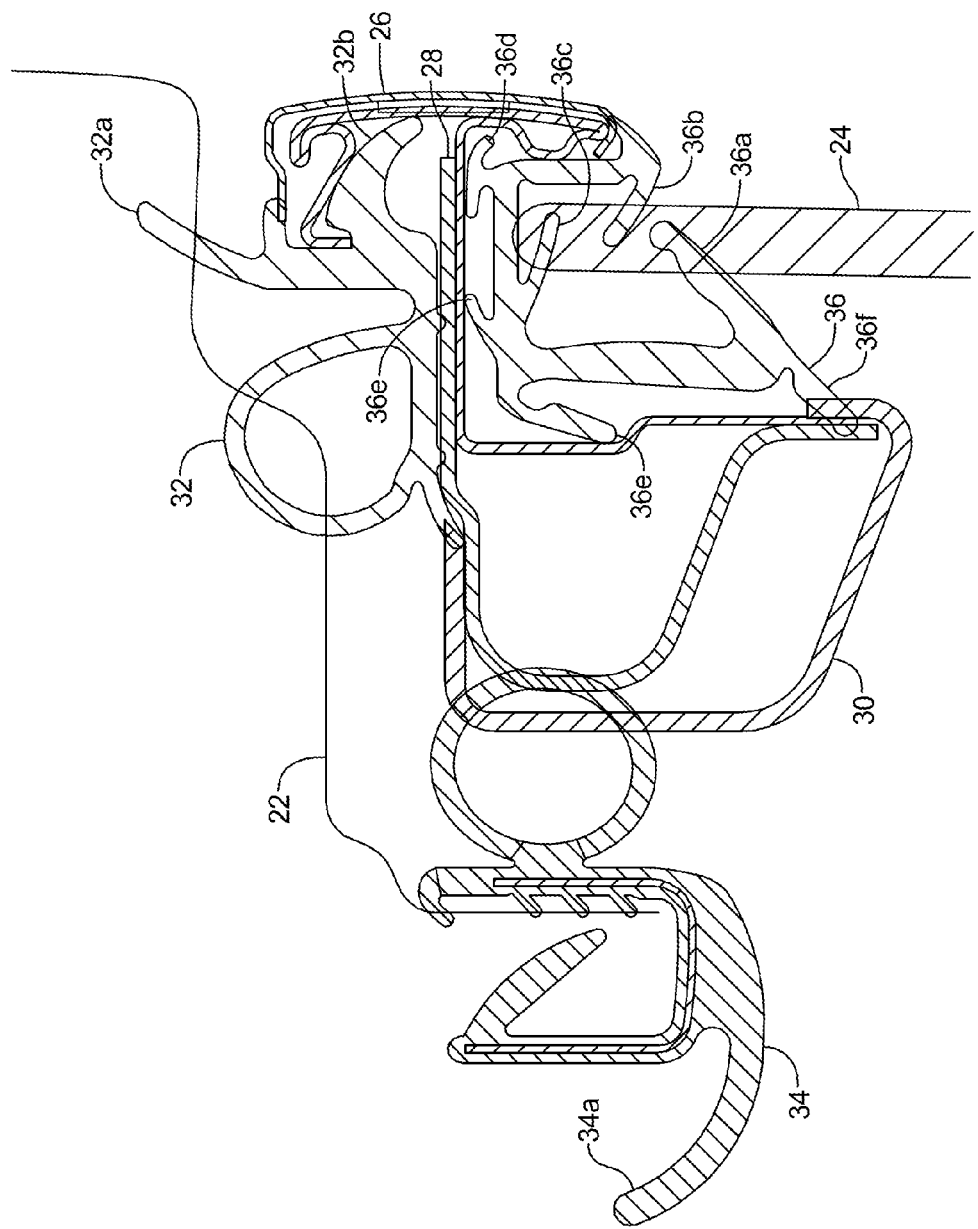
FIG. 2 is a cross-sectional view of a typical current door and typical current door seal system taken through line H-H of FIG. 1.
Figure 3:
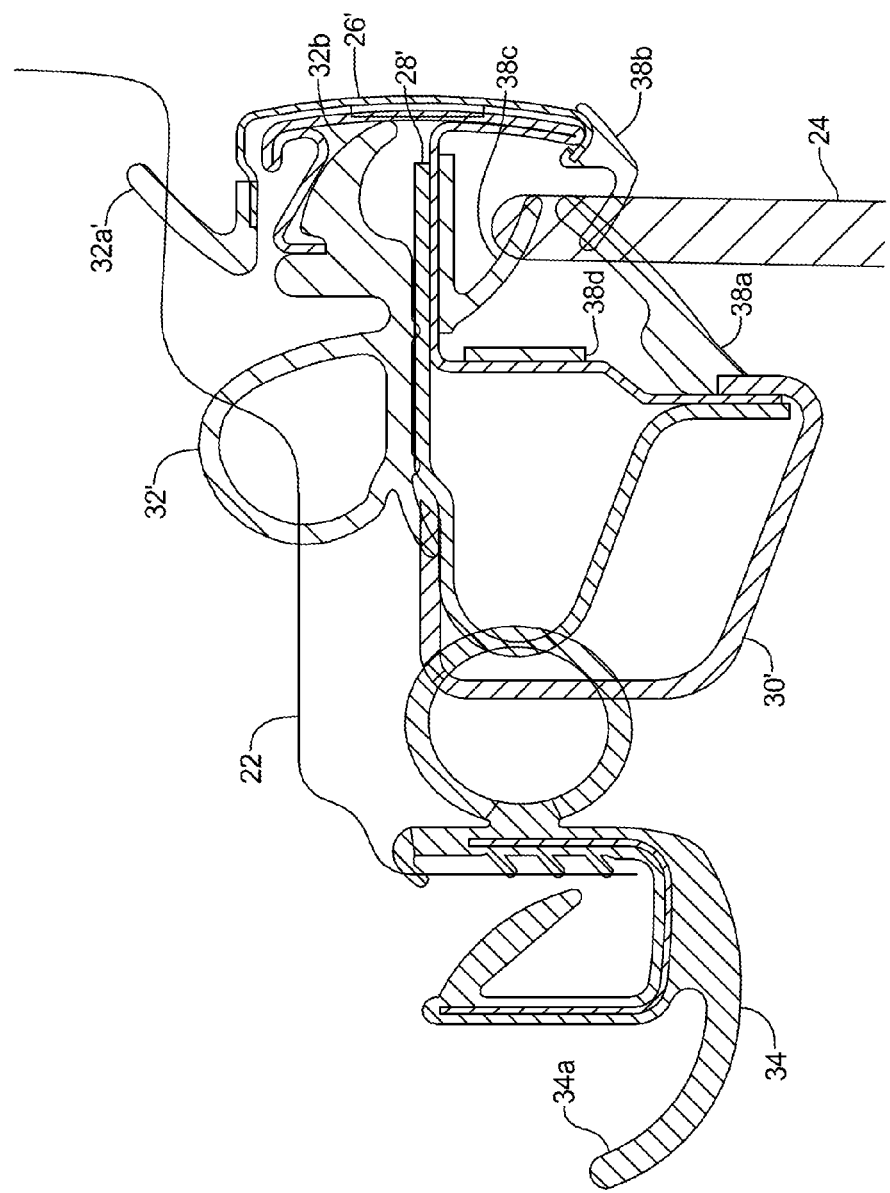
FIG. 3 is a cross-sectional view of an improved door and improved door seal system taken through line H-H of FIG. 1 in accordance with an example embodiment of this invention.
Figure 4:
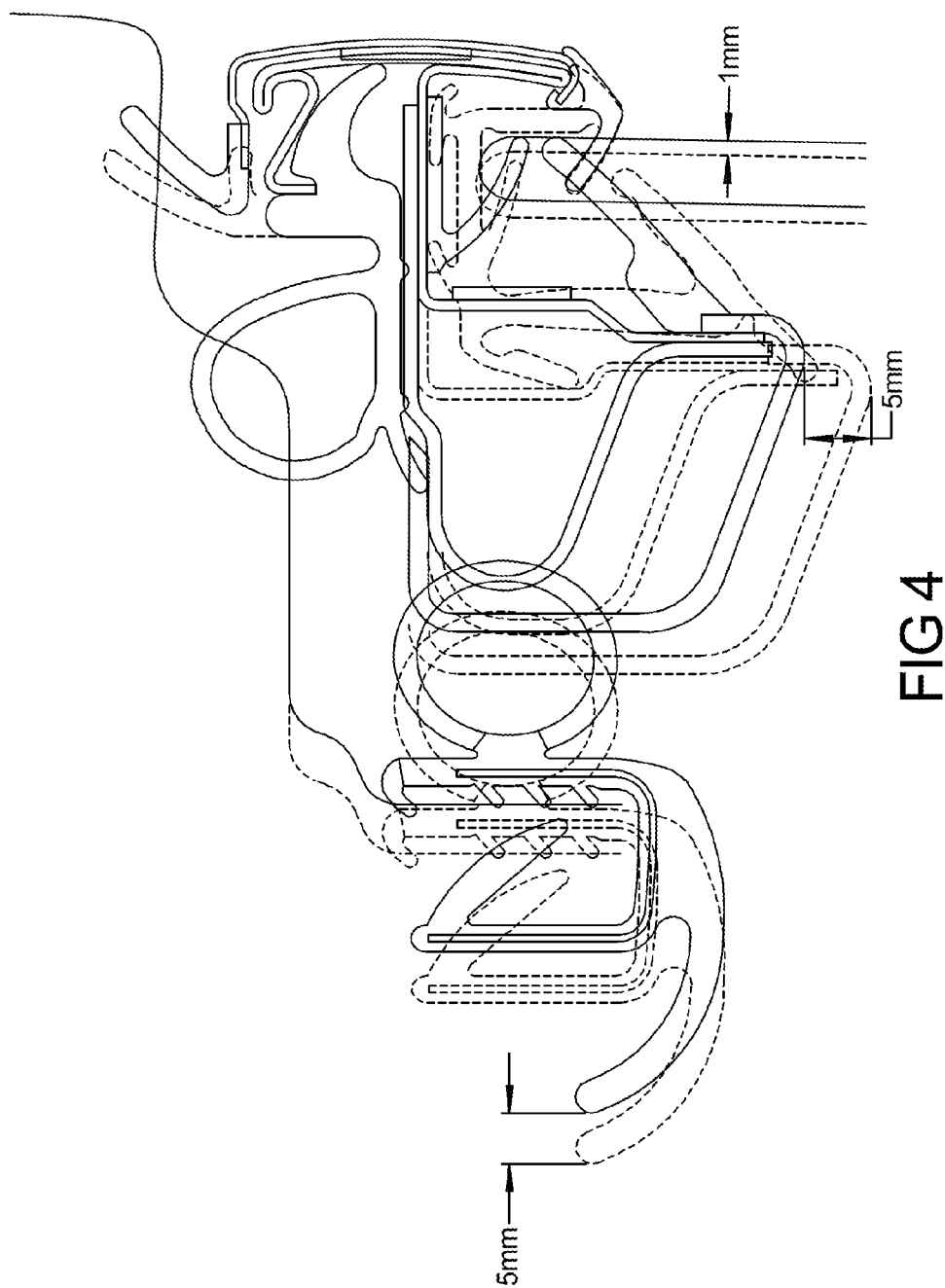
FIG. 4 overlays the FIG. 2 and FIG. 3 example constructions, demonstrating certain example space savings that are realizable in connection with certain example embodiments of this invention.

In this regard, FIG. 2 is a cross-sectional view of a typical current door and typical current door seal system. The cross-sectional views in FIGS. 2-4 are oriented such that the left sides of the drawings correspond to the interiors of the vehicles, whereas the right sides of the drawings correspond to the exteriors of the vehicles. In any event, FIG. 2 shows the upper reaches of the vehicle body 22. As explained in greater detail below, the FIG. 2 example includes first, second, and third seals, and it is the third seal 36 that receives the glass 24 of the window 14, e.g., when the window 14 is a closed position.

The door 12 includes an outer header molding or sash molding component 26. This sash molding component 26 typically is a decorative element formed from a material such as, for example, stainless steel or aluminum. The sash molding component 26 helps conceal the door construct 28 from the exterior of the vehicle. The door construct 28 itself typically includes a roll-formed outer element together with a stamped inner element. Similar to the outer sash molding component 26, an inner sash trim 30 also is provided. The inner sash trim 30 also typically is a decorative element, often made of plastic. It also helps conceal the painted door, e.g., from the bottom of the daylight opening area and above or in the so-called belt area (which typically refers to the generally vertical area separating the window from the door). It will be appreciated that the outer sash molding component 26 and the inner sash trim 30 help provide seal fronts for at least the third seal 36 that receives the glass 24 of the window 14.

As indicated above, the FIG. 2 example includes first, second, and third seals. The first, second, and third seals help seal the interior of the vehicle from the exterior of the vehicle, e.g., so as to reduce wind noise as the vehicle travels, etc. The first seal 32 is provided proximate to the exterior of the vehicle, and it includes a first flexible seal member 32a that can contact the vehicle body 22 and an upper surface of the sash molding 26, as well as a second flexible seal member 32b that can engage with a portion of the door construct 28 so as to help locate and maintain the position of the overall first seal 32. The first seal 32 is sometimes referred to as the "primary seal" or "margin seal." It is sometimes desirable to position the primary seal as close to the edge of the door as possible for aesthetic purposes and to help reduce wind noise. The second seal 34 is provided proximate to the interior of the vehicle. The lip 34a at the left of the second seal 34 is sometimes referred to as a "trim finisher," as it helps hide various components and/or edges (including, for example, unfinished edges) of inner trim pieces. As indicated above, the second seal 34 also helps reduce wind noise.

As indicated above, the third seal 36 receives the glass 24 of the window 14, e.g., when the window 14 is a closed position. It is sometimes referred to as a U-shaped seal, as the glass 24 is insertable into the channel defined by the two legs. The third seal 36 often is formed from EPDM (ethylene propylene diene rubber) or other similar elastomer, and it includes a plurality of flexible members. For example, first and second flexible members 36a and 36b are provided at end portions of the legs of the U-shaped seal 36 so that they help form a seal. A third flexible member 36c comes into contact with an upper surface of the glass 24 when the window 14 is completely closed and helps reduce the likelihood of the glass 24 coming into direct contact with the base of the U-shaped seal 36. Additional flexible seal members 36d, 36e, and 36f help maintain the overall positioning of the U-shaped seal 36.

It often is desirable to reduce the size of the overall door construct, e.g., for aesthetic and functional purposes. Unfortunately, however, practical material constraints often mean that the U-shaped seal cannot simply be made smaller and/or thinner, as there must be some structure so that the sealing function can be met. Certain example embodiments overcome this problem, e.g., by providing arrangements similar to the one shown in and described in connection with FIG. 3.

The FIG. 3 example embodiment, and other similar example embodiments, are advantageous for a number of reasons. For example, the FIG. 3 example embodiment, and other similar example embodiments, provide alternate arrangements that do not compromise the quality of the seals. Indeed, such embodiments may make use of the same basic sealing surfaces and planes as current techniques. Furthermore, the integrated formation techniques are able to provide the same or suitably similar material properties in terms of, for example, flexibility, structure, seal quality, and/or the like.

In this regard, FIG. 3 is a cross-sectional view of an improved door and improved door seal system in accordance with an example embodiment of this invention. The FIG. 3 example embodiment is similar to FIG. 2. For instance, the FIG. 3 example embodiment also shows the upper reaches of the vehicle body 22, together with a glass 24 of the window 14. The second seal 34 with the trim finisher 34a also is the same. However, as will be explained in greater detail below, the first seal 32 has been changed, and the third or U-shaped seal 36 has been completely eliminated. These changes lead to a number of example advantages, which also will be described in detail below.

As indicated above, the first seal 32 of the FIG. 2 example has been changed. In its place, an improved first seal 32' is provided. This improved seal 32' still includes a flexible seal member 32b that is similar to the second flexible seal member 32b of the FIG. 2 example inasmuch as it can engage with a portion of the improved door construct 28' so as to help locate and maintain the position of the overall improved first seal 32'. However, the first flexible seal member 32a of the FIG. 2 example is not present in the FIG. 3 example embodiment. Instead, a flexible seal member 32a' is provided on an improved header molding or sash molding component 26'. The improved sash molding component 26' may still be a roll-form extruded stainless steel or aluminum material. However, EPDM or TPE (thermoplastic elastomer) material may be co-extruded with the sash molding component 26', such that the flexible seal member 32a' is formed together and/or as a part of the sash molding component 26'.

In a similar fashion, flexible seal member 38b also may be co-extruded with the sash molding component 26', such that the flexible seal member 38b is formed together and/or as a part of the sash molding component 26'. As such, in certain example embodiments, the flexible seal member 32a' and the flexible seal member 38b help form an outer glassrun seal and margin seal that is integrated into the header sash molding extrusion.

As indicated above, the third or U-shaped seal 36 has been completely eliminated in the FIG. 3 example embodiment. A plurality of seal members 38 are provided in its place, including the seal member 38b discussed above. A first seal member 38a is formed together with the improved inner sash trim 30'. For example, sash trim 30' may be formed via dual shot molding such that the first seal member 38a is formed from flexible TPE and is connected to the more rigid and/or harder inner sash trim 30'. The first seal member 38a may help form the inner glassrun seal, and the first seal member 38a and the second seal member 38b may help replace the first and second seal members 36a and 36b of the U-shaped seal 36 of the FIG. 2 example.

Additionally, a flexible rubber-type third seal member 38c may be provided with the roll form of the improved door construct 28'. This third seal member 38c may help take the place of the third seal member 36c of the U-shaped seal 36 of the FIG. 2 example. As above, the third seal member 38c may help cushion the glass so that it does not hit the improved door construct 28' (and/or any metal pieces or components thereof).

Finally, a fourth seal member 38d may be provided as a glassrun base on an exterior facing surface of the cavity formed by the improved door construct 28'. This component also may be integrated into the roll-form stamped improved door construct 28', and it may help serve as a barrier or cushion so that the first flexible seal member 38a and/or the glass 24 is/are less likely contact and/or rub against the cavity formed by the improved door construct 28', which can cause "squeaking" during operation of the window.

FIG. 4 overlays the FIG. 2 and FIG. 3 example constructions, demonstrating certain example space savings that are realizable in connection with certain example embodiments of this invention. As explained in detail above and as clearly shown in FIG. 4, certain example embodiments of this invention completely eliminate the need for a U-shaped seal. This may in certain example instances lead to lower costs in terms of material savings and/or assembly requirements. Indeed, in certain example embodiments, there is no need to separately produce, ship, and install the U-shaped seal, less material may be used in certain example embodiments because the overall door construct may be made smaller and because seal members may be integrated with otherwise required components. Of course, it will be appreciated that the space savings shown in FIG. 4 are provided by way of example. More or less space savings may be provided in connection with different example embodiments of this invention. Indeed, the space savings may change based on, for example, whether the U-shaped seal is completely eliminated, whether only a part of the U-shaped seal is eliminated (e.g., in embodiments where only some flexible seal members are integrally formed with the trim components), whether the first seal member is changed or maintained independent of the U-shaped seal, etc.

The smaller overall profile of the door construct also leads to certain example advantages. For instance, as clearly shown in FIG. 4, all of the components are shifted outboard, and maximum height required is decreased. This may sometimes result in more cabin space for the interior of the vehicle, while also providing for a larger daylight opening. Indeed, the reduced size and number of plastic components may enable the glass window to be made larger. Furthermore, because the components are shifted outboard, the glass in the window may be made more flush with outer body of car. This has been found to provide for a more aesthetically pleasing outer appearance, while also leading to the cabin space savings and increased daylight opening size possibilities described above.

Figure 5:
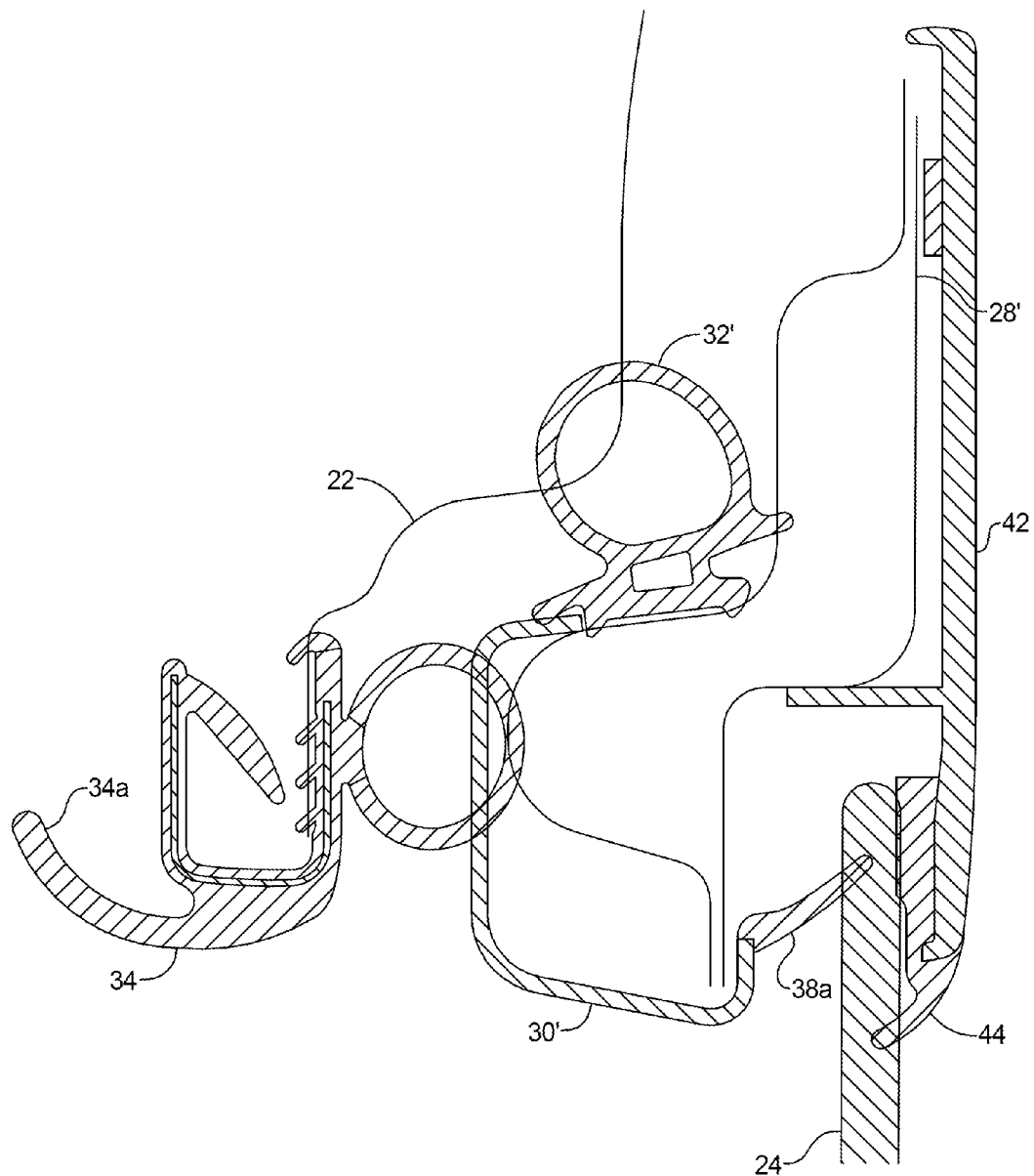
FIG. 5 is a cross-sectional view of an improved door and improved door seal system through the B-pillar of a vehicle (e.g., through line B-B of FIG. 1) in accordance with an example embodiment of this invention.

FIG. 5 is a cross-sectional view of an improved door and improved door seal system through the B-pillar of a vehicle in accordance with an example embodiment of this invention. Example B-pillars are described, for example, in co-pending and commonly assigned Application Serial No. 12/219,065 (U.S. Patent Application Publication No. 2010/0013269 A1, now abandoned), the entire contents of which are hereby incorporated herein by reference. FIG. 5 roughly corresponds to the generally vertical area of the daylight opening of the vehicle. FIG. 5 shows many components in common with the FIG. 3 cross-sectional view. There typically are plastic, metal, or other trim pieces for aesthetic purposes on the outside that may or may not be integrated into the header sash molding. In this regard, FIG. 5 shows a separate trim component 42. This trim component 42 may be the b-pillar applique in certain example embodiments. In certain example embodiments, dual shot molding may be used to form the outside glassrun lip 44 with the trim component 42. Of course, as noted above, the trim component 42 may be integrated into the header sash molding. Similarly, in addition or in the alternative, in certain example embodiments, the glassrun lip 44 may be a single or separate extrusion integrated into the upper extrusion. In the FIG. 5 example embodiment, the inner sash trim 30' would be the same as that shown in FIG. 3 because it corresponds to the same part on the header and generally vertical area.

Figure 6:
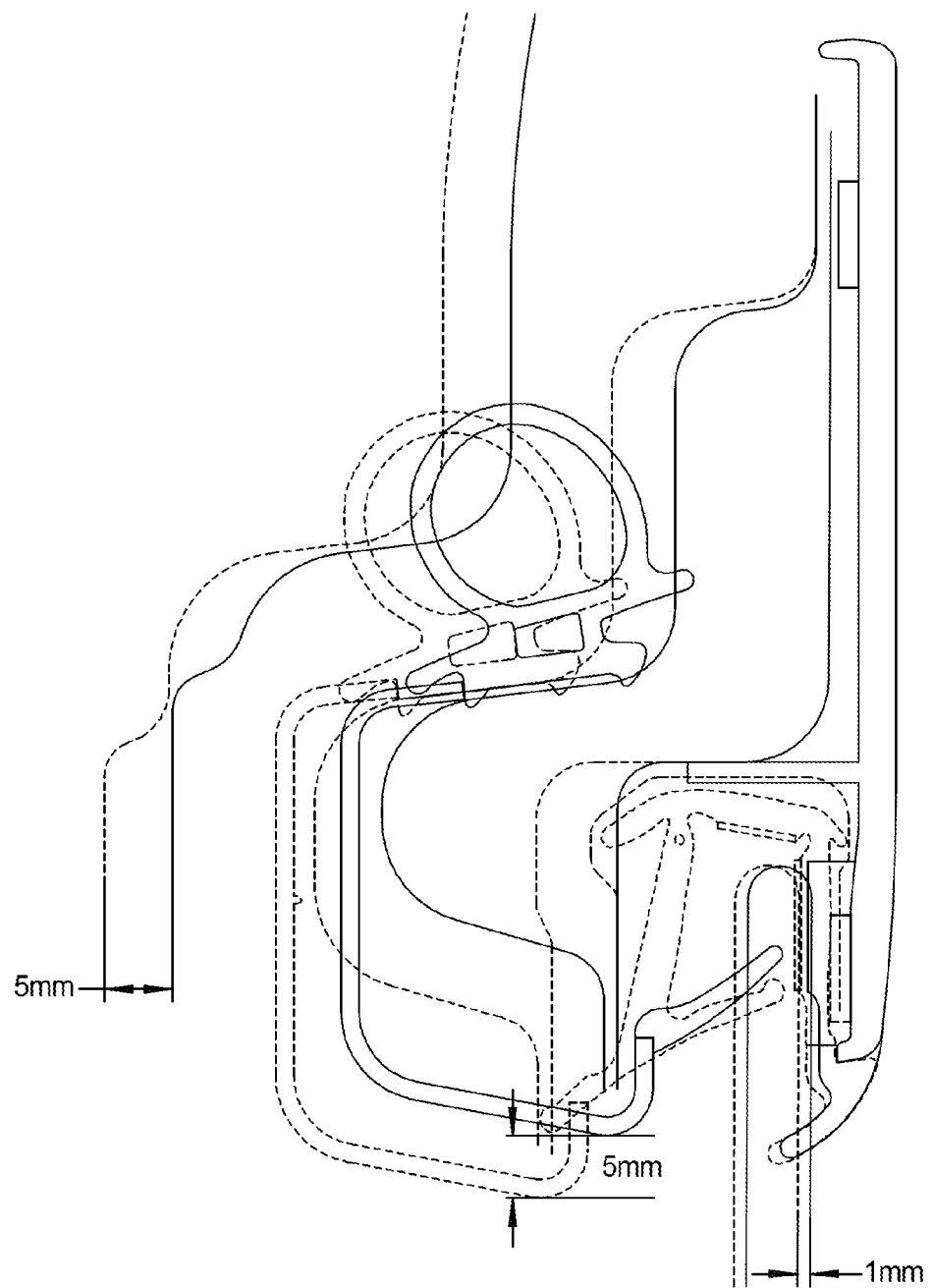
FIG. 6 overlays the a current construction and the FIG. 5 example construction, demonstrating certain example space savings that are realizable in connection with certain example embodiments of this invention.

FIG. 6 is similar to FIG. 4 in that FIG. 6 overlays the a current construction and the FIG. 5 example construction, demonstrating certain example space savings that are realizable in connection with certain example embodiments of this invention. The above-described and/or advantages also can be seen though an examination of FIG. 6.

Although certain example embodiments have been described in relation to automobiles, it will be appreciated that other vehicles may be used in connection with different embodiments of this invention. Such vehicles may include, for example, cars, trucks, tractors, airplanes, boats, etc. Although certain example embodiments have been described in relation to glass windows, it will be appreciated that other materials and/or components may be used in connection with different embodiments of this invention. Alternate material may include other suitable transparent substrates in window-type embodiments. Other components may include, for example, larger doors, hatches, trunks, sunroofs, etc.

Certain example embodiments have been described as being formed using extrusion, co-extrusion, dual shot molding, and/or other techniques in connection with stainless steel, aluminum, and/or plastic trim components. However, certain example embodiments also may use these and/or other techniques to incorporate margin seals and/or glassrun exterior seals into other trim components which may be formed from the same or different materials. Such materials may include, for example, those listed above, chrome, a variety of plastic appliqués, and/or any other appropriate material. Seals also may be formed on different trim components such as, for example, A-pillars, B-pillars, etc.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. A vehicle sealing system, comprising:
    a door frame member including a generally U-shaped cavity formed therein for receiving glass from a window;
    an outer sash molding component covering a first portion of the door frame member;
    an inner sash trim component covering a second portion of the door frame member;
    a first seal including a flexible seal member co-extruded with the outer sash molding component; and
    first, second, and third seal members provided in or on the generally U-shaped cavity formed in the door frame member, wherein:
    the first seal member is dual shot molded together with the inner sash trim component,
    the second seal member is co-extruded with the outer sash molding component such that an end of the outer sash molding component is embedded in the second seal member, the first and second seal members being inwardly rotatable upon receiving a biasing force from upward movement of the glass, and
    the third seal member is provided on a base of the generally U-shaped cavity so as to form a cushion between the glass and the door frame member,
    wherein the first, second and third seal members are non-integrally formed with each other and spaced apart from each other such that the first seal member is directly attached to the inner sash trim component and is individually coupled to the inner sash trim component separately from the second and third seal members, the second seal member is directly attached to the outer sash molding component and is individually coupled to the outer sash molding component separately from the first and third seal members, and the third seal member is directly attached to the base of the generally U-shaped cavity and is individually coupled to the base of the generally U-shaped cavity separately from the first and second seal members.

2. The vehicle sealing system of claim 1, wherein the second seal member forms a glass run seal, and the flexible seal member of the first seal forms a margin seal, wherein the glass run seal and the margin seal integrated into the outer sash molding component.

3. The vehicle sealing system of claim 2, wherein the first seal member forms another glass run seal.

4. The vehicle sealing system of claim 1, wherein the first seal member forms a glass run seal.

5. The vehicle sealing system of claim 1, wherein the sash molding component comprises roll-formed stainless steel or roll-formed aluminum.

6. The vehicle sealing system of claim 1, wherein the flexible seal member of the first seal comprises EPDM or TPE.

7. The vehicle sealing system of claim 1, wherein the first seal member comprises TPE.

8. The vehicle sealing system of claim 1, further comprising a fourth seal member located on an inner leg of the generally U-shaped cavity, the fourth seal member forming a cushion between the first seal member and the inner leg of the cavity.

9. A vehicle door comprising a sealing system, comprising:
    a door frame member including a generally U-shaped cavity formed therein for receiving glass from a window, the door frame member comprising a roll-formed outer structure and a stamped inner structure;
    a roll-formed outer sash molding component provided at an exterior portion of the vehicle door;
    an inner sash trim component provided at an interior portion of the vehicle door; and
    first, second, and third seal members provided in or on the generally U-shaped cavity formed in the door frame member, wherein:
    the first seal member is dual shot molded together with the inner sash trim component,
    the second seal member is co-extruded with the outer sash molding component such that an end of the outer sash molding component is embedded in the second seal member, the first and second seal members being inwardly rotatable upon receiving a biasing force from upward movement of the glass, and
    the third seal member is provided on a base of the generally U-shaped cavity so as to form a cushion between the glass and the door frame member,
    wherein the first, second and third seal members are non-integrally formed with each other and spaced apart from each other such that the first seal member is directly attached to the inner sash trim component and is individually coupled to the inner sash trim component separately from the second and third seal members, the second seal member is directly attached to the outer sash molding component and is individually coupled to the outer sash molding component separately from the first and third seal members, and the third seal member is directly attached to the base of the generally U-shaped cavity and is individually coupled to the base of the generally U-shaped cavity separately from the first and second seal members.

10. The vehicle door of claim 9, further comprising a first seal proximate to an exterior of the sealing system, the first seal including a flexible seal member co-extruded with the outer sash molding component.

11. The vehicle door of claim 10, wherein:
   the second seal member forms an outer glass run seal, and
   the flexible seal member of the first seal forms a margin seal, wherein the glass run seal and the margin seal are integrated into the outer sash molding component, and
   the first seal member forms an inner glass run seal.

12. The vehicle door of claim 9, further comprising a fourth seal member located on an inner leg of the generally U-shaped cavity, the fourth seal member forming a cushion between the first seal member and the inner leg of the cavity.

13. A vehicle comprising the vehicle door according to claim 9.

\* \* \* \* \*